(12) United States Patent
Ikegaya

(10) Patent No.: US 12,259,728 B2
(45) Date of Patent: Mar. 25, 2025

(54) MARINE VESSEL PROPULSION CONTROL SYSTEM AND MARINE VESSEL

(71) Applicant: YAMAHA HATSUDOKI KABUSHIKI KAISHA, Iwata (JP)

(72) Inventor: Yuji Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 226 days.

(21) Appl. No.: 17/740,808

(22) Filed: May 10, 2022

(65) Prior Publication Data

US 2022/0374015 A1    Nov. 24, 2022

(30) Foreign Application Priority Data

May 21, 2021  (JP) ................................. 2021-086424

(51) Int. Cl.
*G05D 1/00*   (2024.01)
*B63H 21/21*  (2006.01)

(52) U.S. Cl.
CPC .......... *G05D 1/0206* (2013.01); *B63H 21/213* (2013.01)

(58) Field of Classification Search
CPC ............... G05D 1/0206; B63H 21/213; B63H 2020/003; B63B 79/40
See application file for complete search history.

(56) References Cited

U.S. PATENT DOCUMENTS

| | | | | |
|---|---|---|---|---|
| 6,099,368 | A  * | 8/2000 | Gorshkov | B63H 19/02 440/9 |
| 2009/0247025 | A1 | 10/2009 | Ryuman | |
| 2010/0248560 | A1* | 9/2010 | Ito | B63H 21/22 440/1 |
| 2013/0080044 | A1* | 3/2013 | Tyers | G08G 3/02 440/1 |
| 2017/0205829 | A1* | 7/2017 | Tyers | B63H 25/04 |
| 2018/0004209 | A1* | 1/2018 | Akuzawa | G05D 1/0206 |
| 2021/0354803 | A1* | 11/2021 | Christensen | B60L 53/20 |
| 2023/0206774 | A1* | 6/2023 | Boyer | G08G 5/0021 701/18 |

FOREIGN PATENT DOCUMENTS

JP    2009-243590 A    10/2009

* cited by examiner

*Primary Examiner* — Ashley L Redhead, Jr.
(74) *Attorney, Agent, or Firm* — Keating & Bennett, LLP

(57) ABSTRACT

A marine vessel propulsion control system includes a controller to control a movement of a marine vessel and propulsion devices each including a power source and a thrust generator to generate a thrust based on a drive force of the power source. The controller controls the movement of the marine vessel to navigate according to a preset sea route including a target position. The controller reduces the drive force of the power source of each of the propulsion devices when the marine vessel reaches a deceleration start position that is spaced apart from the target position by a required deceleration distance, and, after reducing the drive force of the power source of each of the propulsion devices, cuts off transmission of the drive force from the power source to the thrust generator in at least one of the propulsion devices depending on a predetermined condition.

17 Claims, 13 Drawing Sheets

MARINE VESSEL PROPULSION CONTROL SYSTEM AND MARINE VESSEL

CROSS REFERENCE TO RELATED APPLICATIONS

This application claims the benefit of priority to Japanese Patent Application No. 2021-086424, filed on May 21, 2021. The entire contents of this application are hereby incorporated herein by reference.

BACKGROUND OF THE INVENTION

1. Field of the Invention

The present invention relates to a marine vessel propulsion control system and a marine vessel.

2. Description of the Related Art

A marine vessel equipped with a marine vessel propulsion control system that performs a dynamic positioning control that controls a thrust of an engine and a rudder of the marine vessel in an integrated manner to keep the marine vessel in the vicinity of a target position is known (see, for example, Japanese Laid-Open Patent Publication (kokai) No. 2009-243590). Further, a marine vessel that perform a track point, which is an automatic steering mode that causes the marine vessel to navigate to trace a sea route set by a user, is also known. At the track point, it is also possible to set the target position to stop the marine vessel. Further, at the target position, the marine vessel shifts to the dynamic positioning control.

At the track point, since the marine vessel is stopped at the target position, when a distance from the marine vessel to the target position is less than a preset distance, by reducing a throttle and shifting the engine to an idle state, the thrust is reduced and the marine vessel is decelerated.

On the other hand, many marine vessels equipped with such a marine vessel propulsion control system that performs the dynamic positioning control are relatively large-sized cruisers. Since the relatively large-sized cruiser has a large number of outboard motors, even if the engine of each outboard motor is shifted to the idle state a certain amount of a total thrust continues to act on a hull. In addition, since the hull is also large, an inertial force of the hull is also large. Therefore, even if the engine of each outboard motor is shifted to the idle state, since sometimes the marine vessel is not able to decelerate sufficiently, and as a result, the marine vessel passes through the target position, there is room for improvement from the viewpoint of realizing propulsion control of the marine vessel.

SUMMARY OF THE INVENTION

Preferred embodiments of the present invention provide a marine vessel propulsion control system and a marine vessel that are each able to prevent a marine vessel from passing through a target position.

According to a preferred embodiment of the present invention, a marine vessel propulsion control system includes a controller configured or programmed to control a movement of a marine vessel and a plurality of propulsion devices that apply a thrust to the marine vessel. Each of the propulsion devices includes a power source and a thrust generator to generate the thrust based on a drive force of the power source. The controller is configured or programmed to control the movement of the marine vessel so that the marine vessel navigates according to a preset sea route. A target position to stop the marine vessel is set in the preset sea route. The controller is configured or programmed to reduce the drive force of the power source of each of the propulsion devices when the marine vessel reaches a deceleration start position that is spaced apart from the target position by a required deceleration distance, and, after reducing the drive force of the power source of each of the propulsion devices, the controller is configured or programmed to cut off transmission of the drive force from the power source to the thrust generator in at least one of the propulsion devices depending on a predetermined condition.

According to another preferred embodiment of the present invention, a marine vessel propulsion control system includes a controller configured or programmed to control a movement of a marine vessel and only one propulsion device that applies a thrust to the marine vessel. The only one propulsion device includes a power source and a thrust generator to generate the thrust based on a drive force of the power source. The controller is configured or programmed to control the movement of the marine vessel so that the marine vessel navigates according to a preset sea route. A target position to stop the marine vessel is set in the preset sea route. The controller is configured or programmed to reduce the drive force of the power source of the only one propulsion device when the marine vessel reaches a deceleration start position that is spaced apart from the target position by a required deceleration distance, and, after reducing the drive force of the power source of the only one propulsion device, the controller is configured or programmed to repeat cut-off and recovery of transmission of the drive force from the power source to the thrust generator in the only one propulsion device depending on a predetermined condition.

According to another preferred embodiment of the present invention, a marine vessel includes a controller configured or programmed to control a movement of a marine vessel and a plurality of propulsion devices that apply a thrust to the marine vessel. Each of the propulsion devices includes a power source and a thrust generator to generate the thrust based on a drive force of the power source. The controller is configured or programmed to control the movement of the marine vessel so that the marine vessel navigates according to a preset sea route. A target position to stop the marine vessel is set in the preset sea route. The controller is configured or programmed to reduce the drive force of the power source of each of the propulsion devices when the marine vessel reaches a deceleration start position that is spaced apart from the target position by a required deceleration distance, and, after reducing the drive force of the power source of each of the propulsion devices, the controller is configured or programmed to cut off transmission of the drive force from the power source to the thrust generator in at least one of the propulsion devices depending on a predetermined condition.

According to another preferred embodiment of the present invention, a marine vessel includes a controller configured or programmed to control a movement of a marine vessel and only one propulsion device that applies a thrust to the marine vessel. The only one propulsion device includes a power source and a thrust generator to generate the thrust based on a drive force of the power source. The controller is configured or programmed to control the movement of the marine vessel so that the marine vessel navigates according to a preset sea route. A target position to stop the marine vessel is set in the preset sea route. The controller is configured or programmed to reduce the drive force of the power source of the only one propulsion device when the marine vessel reaches a deceleration start position that is spaced apart from the target position by a required deceleration distance, and, after reducing the drive force of the power source of the only one propulsion device, the controller is configured or programmed to repeat cut-off and recovery of transmission of the drive force from the power source to the thrust generator in the only one propulsion device depending on a predetermined condition.

According to preferred embodiments of the present invention, even after the drive forces of the power sources of the propulsion devices are reduced, depending on the predetermined condition, the transmission of the drive force from the power source to the thrust generator is cut off in at least one propulsion device so that it is possible to perform a sufficient deceleration, and as a result, it is possible to prevent the marine vessel from passing through the target position.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
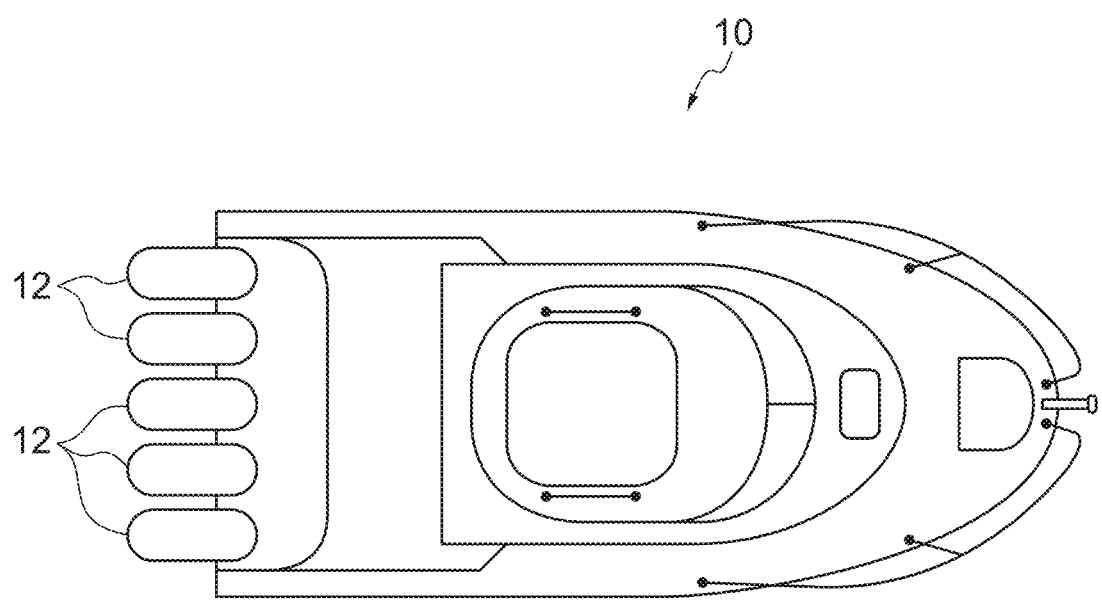
FIG. 1 is a plan view that schematically shows a marine vessel equipped with a marine vessel propulsion control system according to a first preferred embodiment of the present invention.

First, a first preferred embodiment of the present invention will be described. FIG. 1 is a plan view that schematically shows a marine vessel equipped with a marine vessel propulsion control system according to the first preferred embodiment of the present invention. As shown in FIG. 1, a marine vessel 10 is, for example, a planing boat, and includes a hull 11 and five outboard motors 12 functioning as propulsion devices. Each outboard motor 12 is attached to the stern of the hull 11. The outboard motor 12 includes an engine 13 functioning as a power source and a propeller 14 functioning as a thrust generator. The outboard motor 12 obtains a thrust by the propeller 14 being rotated by a drive force of the engine 13, and applies the obtained thrust to the marine vessel 10. The marine vessel, to which the outboard motor 12 is applied, is not limited to the planing boat, and may be, for example, a displacement type marine vessel. The number of the outboard motors 12 provided on the marine vessel 10 is not limited to five, and may be at least two or more. The orientation of each of the outboard motors 12 with respect to the hull 11 is able to be changed by a steering mechanism (not shown), and as a result, by changing an acting direction of the thrust of each outboard motor 12, a traveling direction of the marine vessel 10 is changed.

Figure 2:
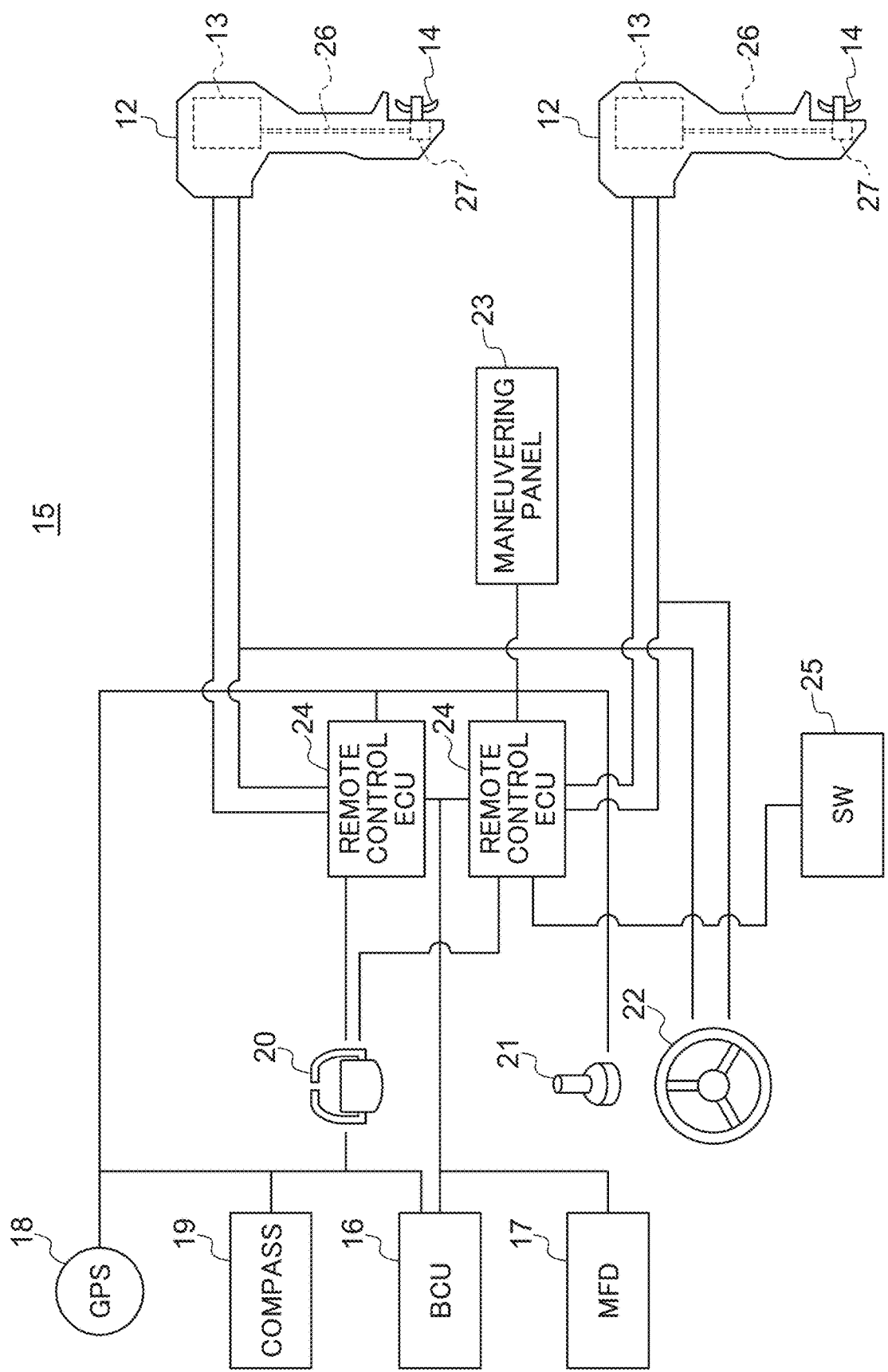
FIG. 2 is a block diagram for schematically explaining a configuration of the marine vessel propulsion control system mounted on the marine vessel of FIG. 1.

FIG. 2 is a block diagram for schematically explaining a configuration of a marine vessel propulsion control system 15 mounted on the marine vessel 10 of FIG. 1. Moreover, in FIG. 2, for ease of understanding, only two outboard motors 12 are intentionally depicted.

As shown in FIG. 2, the marine vessel propulsion control system 15 includes the outboard motors 12, a BCU (Boat Control Unit) 16 that functions as a controller, an MFD (Multi Function Display) 17, a GPS (Global Positioning System) 18, a compass 19, a remote controller 20, a joystick 21, a steering wheel 22, a maneuvering panel 23, remote control ECUs (Engine Control Units) 24, and a switch (SW) 25. Respective components of the marine vessel propulsion control system 15 are communicably connected to each other.

The GPS 18 obtains the current position of the marine vessel 10 and transmits the current position of the marine vessel 10 to the BCU 16. The compass 19 obtains the traveling direction of the marine vessel 10 and transmits the traveling direction of the marine vessel 10 to the BCU 16. The MFD 17 is a display device that indicates a vessel speed of the marine vessel 10 and an engine speed of the engine 13, and includes a touch panel 34 to accept an instruction from a passenger. The accepted instruction is transmitted to the BCU 16.

Each outboard motor 12 includes a drive shaft 26 and a clutch mechanism 27 in addition to the engine 13 and the propeller 14. The engine 13 is connected to the propeller 14 via the drive shaft 26 and the clutch mechanism 27. The clutch mechanism 27 controls cut-off and recovery (e.g., reconnection) of the transmission of the drive force of the engine 13 to the propeller 14.

Figure 3A:
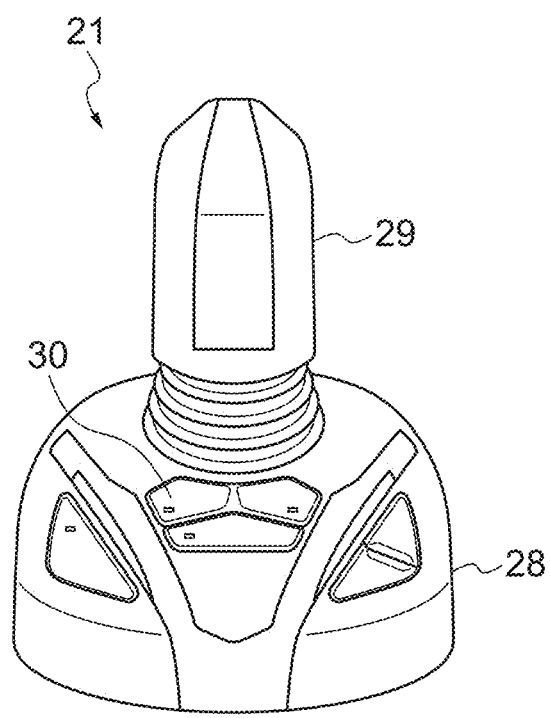
FIGS. 3A and 3B are external views that schematically show configurations of a remote controller and a joystick that are shown in FIG. 2.
Figure 3B:
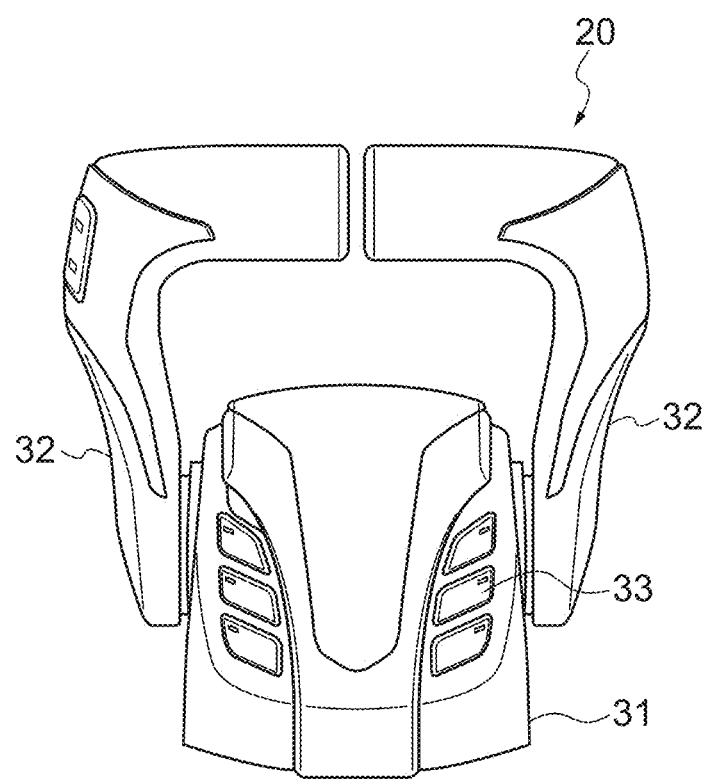

FIGS. 3A and 3B are external views that schematically show configurations of the remote controller 20 and the joystick 21 that are shown in FIG. 2. Specifically, FIG. 3A shows the configuration of the joystick 21, and FIG. 3B shows the configuration of the remote controller 20.

As shown in FIG. 3A, the joystick 21 includes a base 28, a stick 29 attached to the top of the base 28, and a plurality of buttons 30 provided on the base 28. The stick 29 is able to swing freely with respect to the base 28 so that the passenger is able to intuitively perform maneuvering of the marine vessel 10. For example, when the passenger moves the stick 29 back and forth, the joystick 21 emits a signal to move the marine vessel 10 back and forth, and when the passenger moves the stick 29 left and right, the joystick 21 emits a signal to move the marine vessel 10 left and right. When the passenger turns (pivots) the stick 29, the joystick 21 emits a signal to turn (pivot) the marine vessel 10. The signal from the joystick 21 is transmitted to each remote control ECU 24 and the BCU 16.

Instructions to start/end various kinds of maneuvering modes are assigned to the plurality of buttons 30, and depending on which one of the plurality of buttons 30 is pressed, the joystick 21 transmits an instruction signal to start or end a maneuvering mode corresponding to the one of the plurality of buttons 30 to each remote control ECU 24 and the BCU 16. The maneuvering modes assigned to the plurality of buttons 30 include, for example, Fish Point, Stay Point, Drift Point (all of which are registered trademarks in the United States and other countries), and the track point. At the Fish Point, the thrust of each outboard motor 12 and the acting direction of the thrust of each outboard motor 12 are controlled so as to keep the marine vessel 10 at a target position (a fixed position) and cause the bow or stern of the marine vessel 10 to face the water flow of a river or the flow of wind. Further, at the Stay Point, the thrust of the outboard motor 12 and the acting direction of the thrust of the outboard motor 12 are controlled in an integrated manner so as to keep the marine vessel 10 at the target position and maintain a bow direction (the orientation of the bow) in a specific direction. That is, the Fish Point and the Stay Point are dynamic positioning controls that restrict movement of the marine vessel 10 so as to keep the marine vessel 10 at the target position. At the Drift Point, the thrust of the outboard motor 12 and the acting direction of the thrust of the outboard motor 12 are controlled so as to maintain the bow direction in the specific direction. At the Drift Point, the movement of the marine vessel 10 is not restricted, and the marine vessel 10 is able to be moved by the wind or the water flow. At the track point, the thrust of the outboard motor 12 and the acting direction of the thrust of the outboard motor 12 are controlled in an integrated manner so that the marine vessel 10 is navigated according to a route (a sea route) inputted in advance by the passenger with the MFD 17.

As shown in FIG. 3B, the remote controller 20 includes a base 31, shift levers 32 attached to sides of the base 31, and a plurality of buttons 33 provided on the base 31. The shift levers 32 are able to be moved back and forth with respect to the base 31. When the passenger moves the shift levers 32 to a forward position at the front, the remote controller 20 emits a signal to move the marine vessel 10 toward the bow direction, and when the passenger moves the shift levers 32 to a reverse position at the back, the remote controller 20 emits a signal to move the marine vessel 10 toward a stern direction. The remote controller 20 emits a signal to adjust the vessel speed of the marine vessel 10 in response to an operation amount of the shift levers 32 by the passenger. For example, when the operation amount of the shift levers 32 forward is large, the remote controller 20 emits a signal to further increase the vessel speed toward the bow direction, and when the operation amount of the shift levers 32 backward is large, the remote controller 20 emits a signal to further increase the vessel speed toward the stern direction. When the passenger moves the shift levers 32 to a neutral position between the forward position and the reverse position, the remote controller 20 emits a signal to cut off the transmission of the drive force of the engine 13 to the propeller 14 by the clutch mechanism 27. In a deceleration control process described below, after the BCU 16 cuts off the transmissions of the drive forces of the engines 13 of all the outboard motors 12 to the propellers 14, and when the passenger moves the shift levers 32 to the neutral position, depending on a condition, the remote controller 20 emits a signal to start the dynamic positioning control. The signal from the remote controller 20 is transmitted to each remote control ECU 24 and the BCU 16.

Similar to the plurality of buttons 30 of the joystick 21, the instructions to start/end various kinds of maneuvering modes are assigned to the plurality of buttons 33, and depending on which one of the plurality of buttons 33 is pressed, the remote controller 20 transmits an instruction signal to start or end a maneuvering mode corresponding to the one of the plurality of buttons 33 to each remote control ECU 24 and the BCU 16.

Returning to FIG. 2, the steering wheel 22 accepts a steering operation of the passenger, and transmits a signal of a steering angle corresponding to the accepted steering operation to each remote control ECU 24. The switch 25 accepts a power on instruction and a start instruction of each outboard motor 12, and transmits a signal corresponding to the accepted instruction to each remote control ECU 24.

The BCU 16 obtains the situation of the marine vessel 10 based on the signals transmitted from the respective components of the marine vessel propulsion control system 15, determines a thrust that each outboard motor 12 should generate and an acting direction of the thrust that should be taken, and transmits the resulting determination to each remote control ECU 24. The BCU 16 performs the deceleration control, which will be described below, when performing the track point. The remote control ECU 24 is provided one by one corresponding to each outboard motor 12, and controls the thrust and the acting direction of the thrust of the corresponding outboard motor 12 in response to the signals transmitted from the BCU 16, the remote controller 20, the joystick 21, etc. The remote control ECU 24 controls the cut-off and the recovery of the transmission of the drive force of the engine 13 to the propeller 14 by the clutch mechanism 27.

Figure 4:
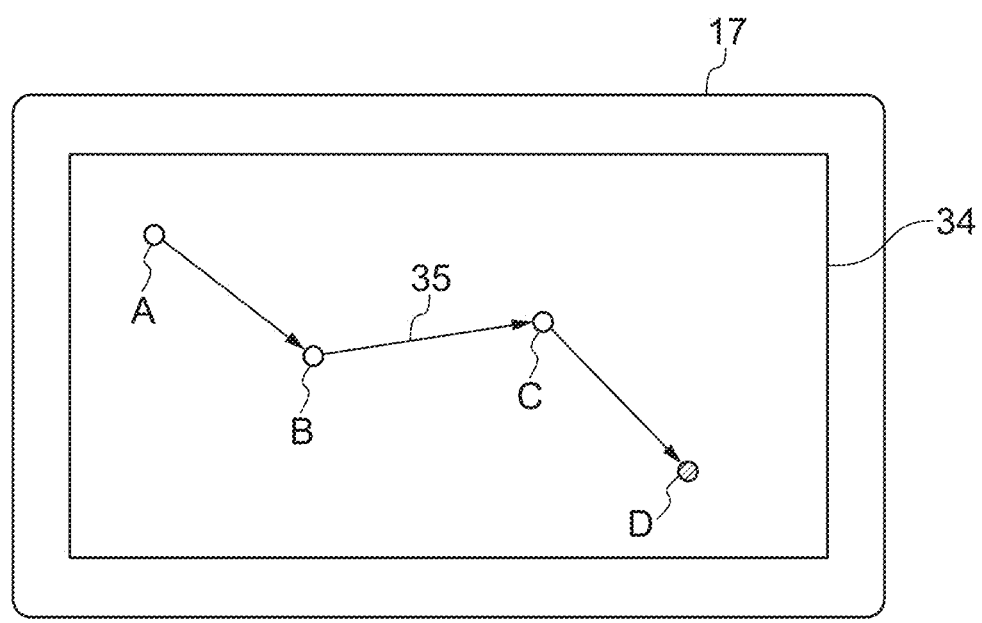
FIG. 4 is a diagram for explaining the function of an MFD (Multi Function Display) that is shown in FIG. 2.

FIG. 4 is a diagram for explaining the function of the MFD 17 shown in FIG. 2. As described above, the MFD 17 includes the touch panel 34, and accepts the instruction from the passenger via the touch panel 34. The instruction from the passenger, which is accepted by the MFD 17, includes, for example, setting the target position at the Fish Point, setting the target position at the Stay Point, and setting the sea route that the marine vessel 10 follows at the track point. The touch panel 34 displays a marine chart, and the passenger sets the target position and the sea route by directly touching a desired point on the marine chart with a finger, a stylus pen, or the like. The passenger may set the target position and the sea route by moving a cursor (not shown) displayed on the touch panel 34 to the desired point by using the stick 29 of the joystick 21.

For example, as shown in FIG. 4, the passenger sets a target position D that is the destination from a current position A, and via-point positions B and C that should be routed along the way by touching the desired point on the marine chart displayed on the touch panel 34 of the MFD 17 with a finger or the like before causing the BCU 16 to execute the track point. When the via-point positions B and C, and the target position D are set, a sea route 35 from the current position A to the target position D via the via-point positions B and C is set. As a result, the passenger is able to intuitively set the sea route 35 by using the touch panel 34.

The via-point positions B and C, the target position D, and the sea route 35 that are shown in FIG. 4 are examples, and the passenger is able to set an arbitrary target position and arbitrary via-point positions by directly touching the touch panel 34 with a finger or the like. For example, by displaying a pop-up menu on the touch panel 34, the passenger is able to set a moving speed in the sea route 35, whether or not to execute the dynamic positioning control such as the Fish Point or the Stay Point at the target position D, and whether or not to execute the drift point at the target position D.

After the sea route 35 is set, when the button 30 of the joystick 21 or the button 33 of the remote controller 20 is pressed down by the passenger to execute the track point, the marine vessel 10 navigates from the current position A so as to reach the target position D via the via-point positions B and C. In the case of setting to execute the dynamic positioning control at the target position D, the marine vessel 10 stops at the target position D, executes the Fish Point or the Stay Point that is the dynamic positioning control, and stays at the target position D. Here, in order for the marine vessel 10 to stop at the target position D, it is necessary to start deceleration before the marine vessel 10 reaches the target position D.

Figure 5:
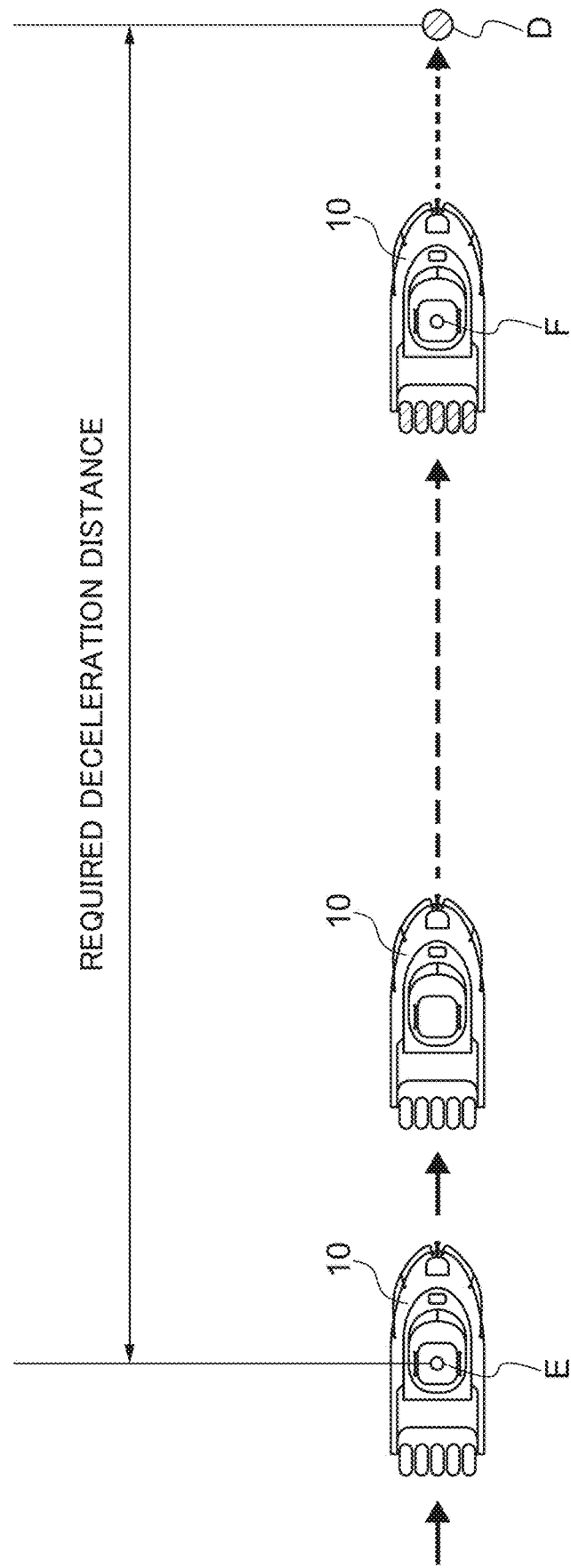
FIG. 5 is a diagram for schematically explaining a conventional deceleration control at the track point.

FIG. 5 is a diagram for schematically explaining a conventional deceleration control at the track point. In the example of FIG. 5, it is assumed that it is set by the passenger to execute the dynamic positioning control at the target position D after executing the track point. Further, hereinafter, the cut-off of the transmission of the drive force of the engine 13 of the outboard motor 12 to the propeller 14 is referred to as "shift out".

In FIG. 5, when the marine vessel 10 reaches a deceleration start position E that is spaced apart from the target position D by a required deceleration distance that is a distance at which the marine vessel 10 cannot be stopped at target position D if the marine vessel 10 does not start the deceleration, the BCU 16 reduces a throttle of the engine 13 of each outboard motor 12 to shift to an idle state, and the drive force generated by each engine 13 is reduced. As a result, the thrust generated by each outboard motor 12 also decreases, and the vessel speed of the marine vessel 10 begins to decrease.

After that, the marine vessel 10 approaches the target position D at a low vessel speed while the engine 13 of each outboard motor 12 is maintained in the idle state (see the broken line arrow in FIG. 5). Then, when the marine vessel 10 reaches a shift-out position F just before the target position D (i.e., the shift-out position F in front of the target position D), for example, when the marine vessel 10 reaches the shift-out position F several meters before the target position D, the BCU 16 shifts out all the outboard motors 12. In addition, at this time, the BCU 16 causes the MFD 17 or the like to display a mark or an icon to prompt the passenger to move the shift levers 32 to the neutral position. It should be noted that the moving of the shift levers 32 to the neutral position may be prompted to the passenger by sounding a buzzer or the like instead of displaying a mark or an icon on the MFD 17 or the like. Correspondingly, when the passenger moves the shift levers 32 to the neutral position, the BCU 16 starts the dynamic positioning control.

At the track point, even if all the outboard motors 12 are shifted out at the shift-out position F, the marine vessel 10 navigates toward the target position D only by an inertial force (see the thin broken line arrow in FIG. 5). Then, as a portion of the dynamic positioning control, the BCU 16 causes each outboard motor 12 to generate a thrust in a direction opposite to the traveling direction of the marine vessel 10 so as to stop the marine vessel 10 at the target position D.

Figure 6:
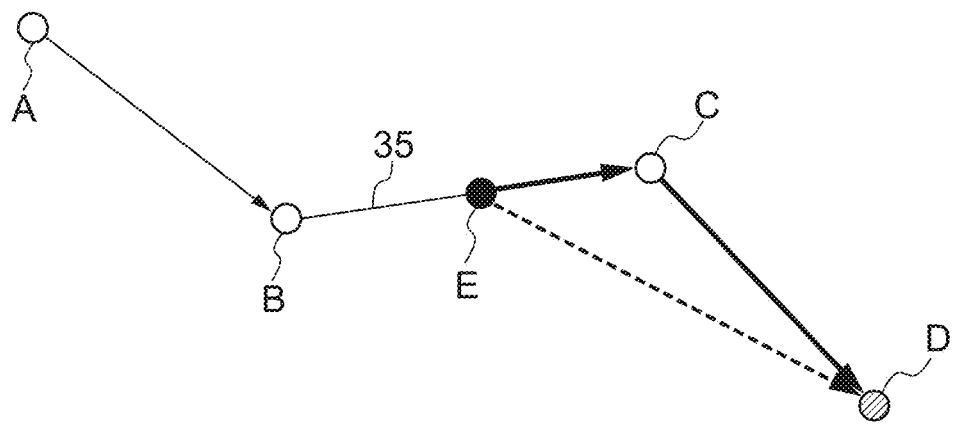
FIG. 6 is a diagram for schematically explaining a sea route that is followed by the marine vessel at the track point.

For example, whether or not the marine vessel 10 has reached the deceleration start position E is not judged by whether or not a linear distance from the marine vessel 10 to the target position D (see a broken line arrow in FIG. 6) becomes equal to the required deceleration distance, but is judged by whether or not a distance along the sea route 35 from the marine vessel 10 to the target position D (see the thick solid line arrow in FIG. 6) becomes equal to the required deceleration distance. It should be noted that the required deceleration distance varies depending on the vessel speed of the marine vessel 10, the number of the outboard motors 12 included in the marine vessel 10, and the size of the hull 11. Specifically, the higher the vessel speed of the marine vessel 10, the longer the required deceleration distance; the larger the number of the outboard motors 12 included in the marine vessel 10, the longer the required deceleration distance; and the larger the size of the hull 11, the longer the required deceleration distance.

Since the marine vessel 10 includes the five outboard motors 12, even if the engine 13 of each outboard motor 12 shifts to the idle state and the thrust generated by each outboard motor 12 decreases, a total thrust, which is not low and is obtained by summing the thrusts of all the outboard motors 12 (the five outboard motors 12), continues to act on the hull 11. As a result, when the marine vessel 10 reaches the shift-out position F, sometimes the vessel speed is higher than an assumed speed. Therefore, after the marine vessel 10 reaches the shift-out position F and before the passenger moves the shift levers 32 to the neutral position and the dynamic positioning control is started, sometimes the marine vessel 10 passes through the target position D even if the dynamic positioning control is started and each outboard motor 12 generates the thrust in the direction opposite to the traveling direction of the marine vessel 10 and the marine vessel 10 does not stay at the target position D. In addition, since the hull 11 of the marine vessel 10 including the five outboard motors 12 is large, the inertial force of the hull 11 is large in the first place. As a result, even if the dynamic positioning control is started by the time the marine vessel 10 reaches the target position D and each outboard motor 12 generates the thrust in the direction opposite to the traveling direction of the marine vessel 10, sometimes the marine vessel 10 cannot be stopped, the marine vessel 10 passes through the target position D, and the marine vessel 10 does not stay at the target position D.

In the first preferred embodiment of the present invention, in order to handle such a situation, before the marine vessel 10 reaches the shift-out position F, depending on a predetermined condition, several the outboard motors 12 are shifted out instead of all the outboard motors 12.

Figure 7A:
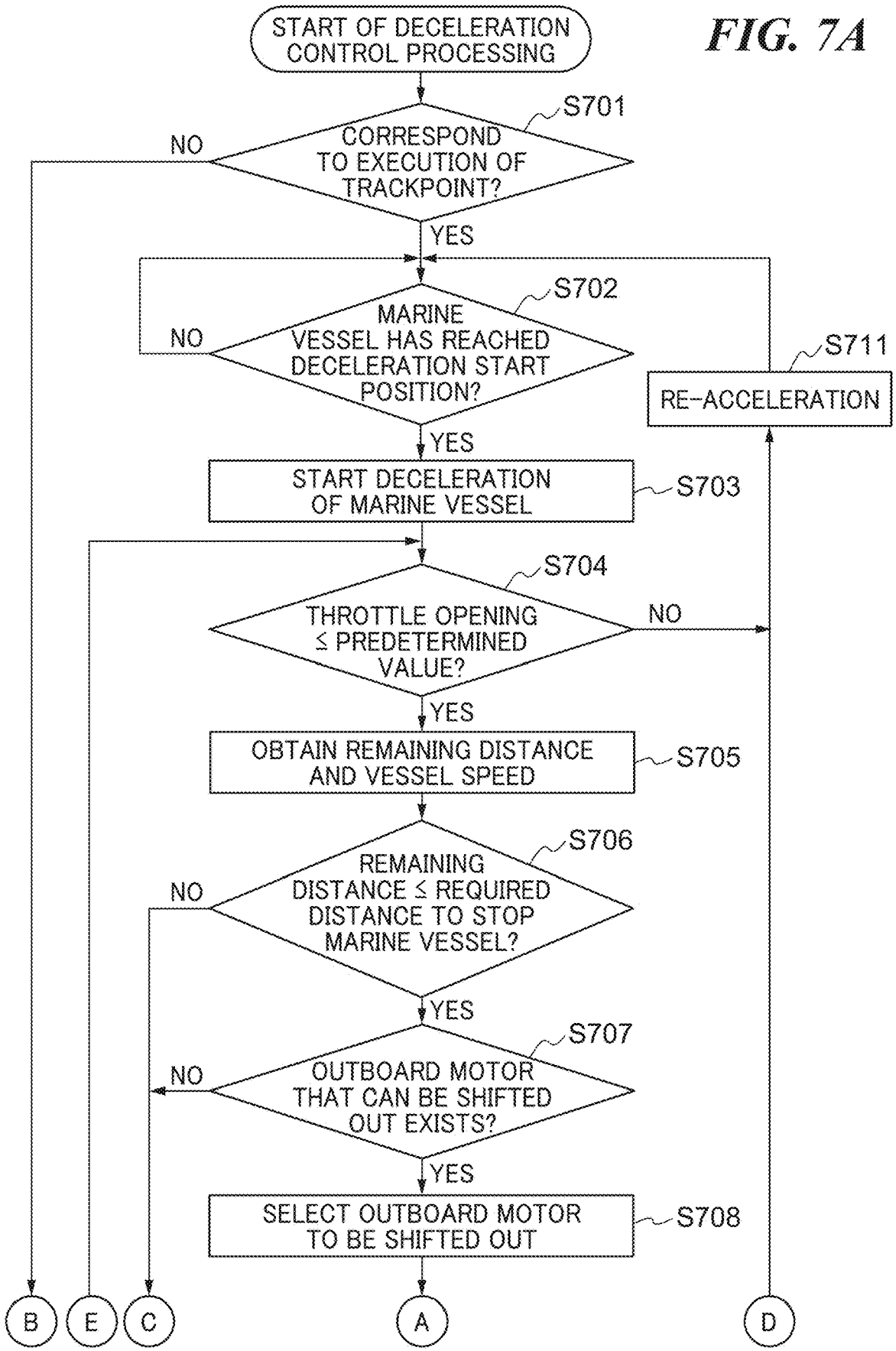
FIG. 7A is a portion of a flowchart that shows a deceleration control process according to the first preferred embodiment of the present invention.
Figure 7B:
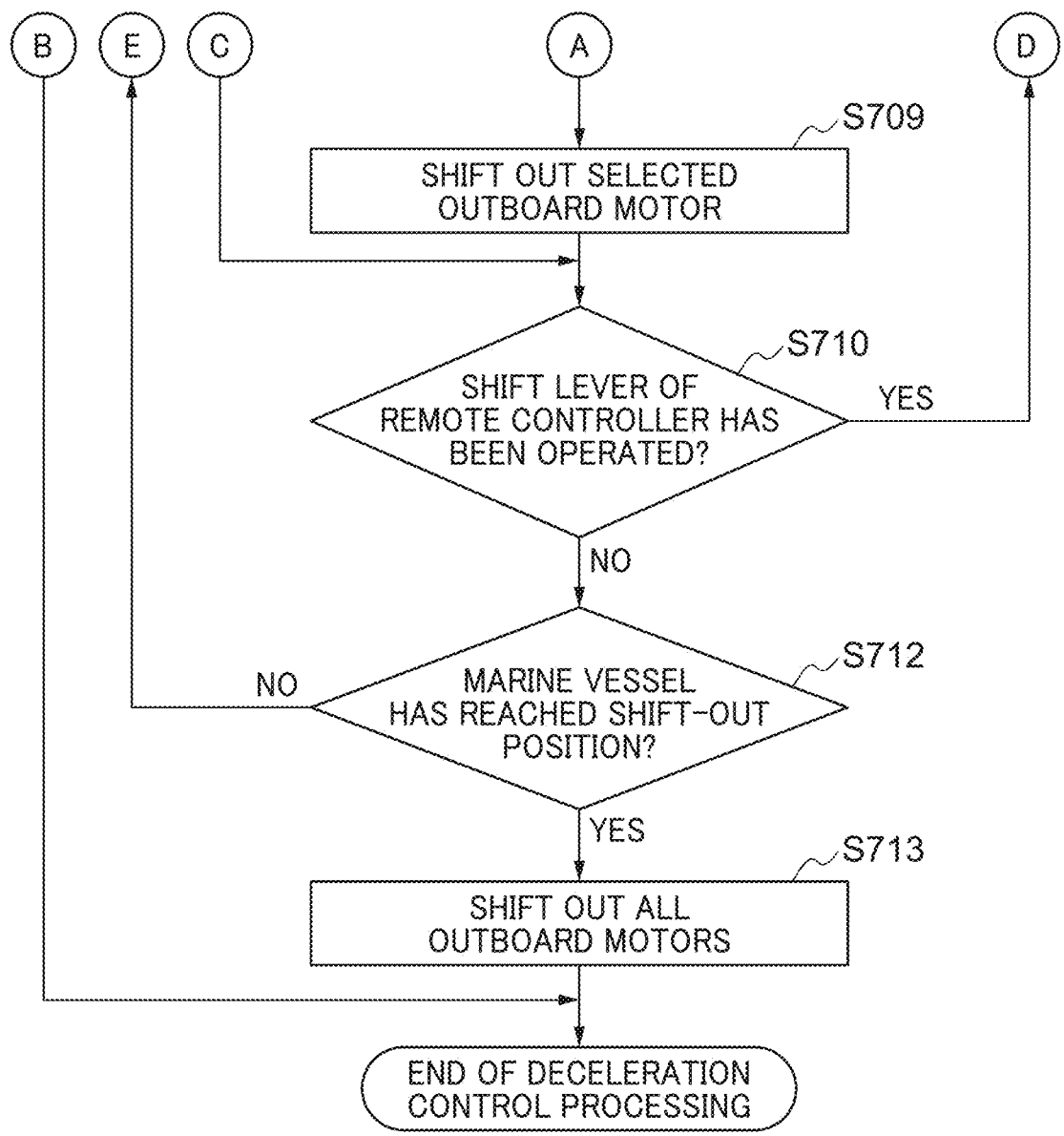
FIG. 7B is a portion of the flowchart that shows the deceleration control process according to the first preferred embodiment of the present invention.
Figure 8:
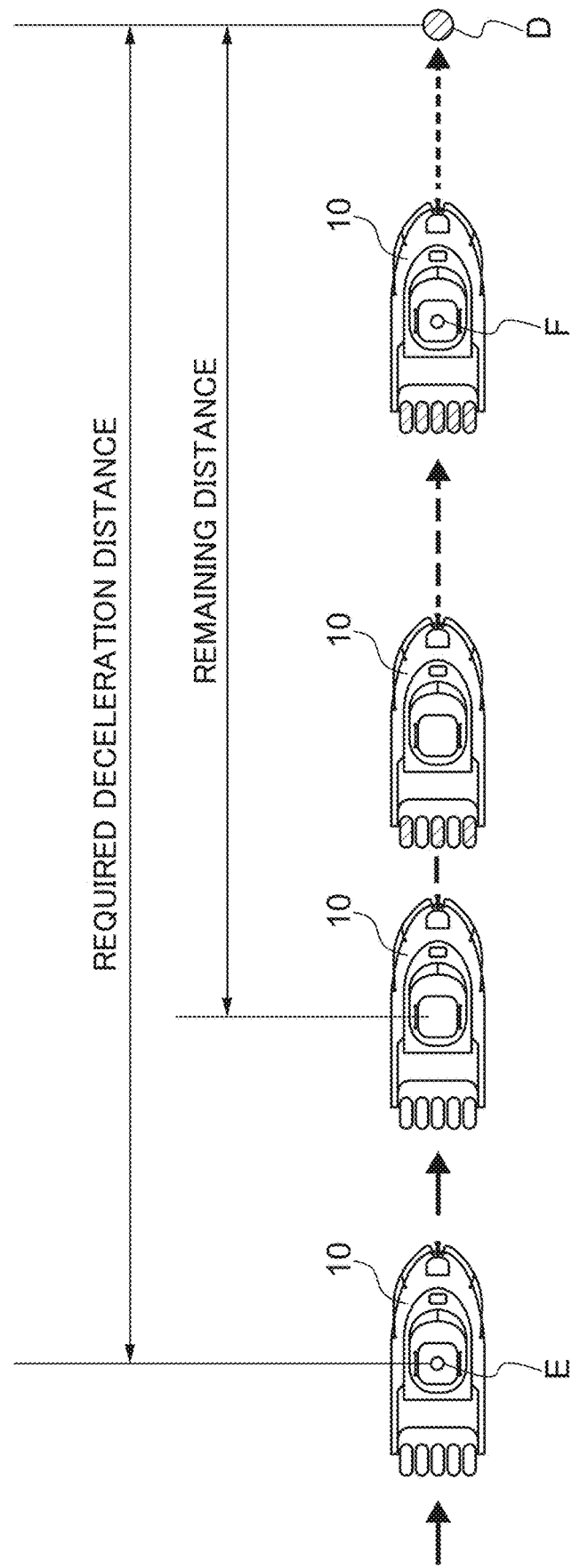
FIG. 8 is a diagram for schematically explaining the deceleration control in the first preferred embodiment of the present invention.

FIGS. 7A and 7B is a flowchart that shows the deceleration control process according to the first preferred embodiment of the present invention. FIG. 8 is a diagram for schematically explaining the deceleration control in the first preferred embodiment of the present invention. The deceleration control process is executed after the passenger sets the sea route 35 by using the MFD 17. It should be noted that when the deceleration control process is executed, it is assumed that it is set by the passenger to execute the dynamic positioning control at the target position D after executing the track point.

First, when the button 33 of the remote controller 20 or the button 30 of the joystick 21 is pressed down by the passenger, the BCU 16 judges whether or not the button that is pressed down corresponds to the execution of the track point (step S701). In the case of judging that the button that is pressed down does not correspond to the execution of the track point, the BCU 16 ends the deceleration control process. On the other hand, in the case of judging that the button that is pressed down corresponds to the execution of the track point, the BCU 16 shifts the maneuvering mode of the hull 11 to the track point, and controls the thrust of each outboard motor 12 and the acting direction of the thrust of each outboard motor 12 so that the marine vessel 10 follows the sea route 35.

After that, the BCU 16 obtains information on the position, the vessel speed, and the traveling direction of the marine vessel 10 from the GPS 18 and the compass 19, and judges whether or not the marine vessel 10 has reached the deceleration start position E (step S702). In the case of judging that the marine vessel 10 has not reached the deceleration start position E, the BCU 16 returns the process to step S702. On the other hand, in the case of judging that the marine vessel 10 has reached the deceleration start position E, the BCU 16 shifts the engine 13 of each outboard motor 12 to the idle state so as to reduce the thrust generated by each outboard motor 12, and starts the deceleration of the marine vessel 10 (step S703).

Next, the BCU 16 judges whether or not a throttle opening of each engine 13 is equal to or less than a predetermined value based on the position of the shift levers 32 of the remote controller 20 (step S704). The predetermined value referred to here is a throttle opening slightly larger than a throttle opening in which the engine 13 is in the idle state. In the case that the throttle opening is larger than the predetermined value, it is considered that the passenger intentionally operates the shift levers 32 to prevent the engine 13 of each outboard motor 12 from shifting to the idle state, that is, it is considered that the passenger does not want to decelerate. As a result of the judgment in step S704, in the case of judging that the throttle opening is larger than the predetermined value, the BCU 16 advances the process to step S711 described below, and on the other hand, in the case of judging that the throttle opening is equal to or less than the predetermined value, the BCU 16 advances the process to step S705.

Next, the BCU 16 obtains a distance to the target position D (hereinafter referred to as "a remaining distance") and the vessel speed from the GPS 18 and the compass 19 (step S705), and then judges whether or not the remaining distance is equal to or less than a required distance to stop the marine vessel 10 (hereinafter referred to as "a required stopping-vessel distance") (step S706). The required stopping-vessel distance referred to here is a distance required to decelerate the marine vessel 10, in which the engine 13 has shifted to the idle state, by resistance of water or the like, to the extent that the marine vessel 10 can be stopped at the target position D when all the outboard motors 12 are shifted out at the shift-out position F. In the case that the remaining distance is equal to or less than the required stopping-vessel distance, the marine vessel 10 cannot be sufficiently decelerated by the time it reaches the shift-out position F, and the marine vessel 10 passes through the target position D.

It should be noted that the required stopping-vessel distance changes according to the vessel speed of the marine vessel 10 at the time of the judgment in step S706. Specifically, the higher the vessel speed of the marine vessel 10, the longer the required stopping-vessel distance. In addition, the larger the number of the outboard motors 12 included in the marine vessel 10, the longer the required stopping-vessel distance; and the larger the size of the hull 11, the longer the required stopping-vessel distance. As a result of the judgment in step S706, in the case of judging that the remaining distance is longer than the required stopping-vessel distance, the BCU 16 advances the process to step S710 described below, and on the other hand, in the case of judging that the remaining distance is equal to or less than the required stopping-vessel distance, the BCU 16 advances the process to step S707.

In step S707, the BCU 16 judges whether or not the outboard motor 12 that is able to be shifted out exists. Specifically, when the outboard motor 12 that has not been shifted out yet is shifted out, the BCU 16 judges whether or not all the outboard motors 12 are in a shifted-out state. Then, in the case of judging that all the outboard motors 12 are in the shifted-out state, the BCU 16 judges that the outboard motor 12 that is able to be shifted out does not exist.

As a result of the judgment in step S707, in the case of judging that the outboard motor 12 that is able to be shifted out does not exist, the BCU 16 advances the process to step S710 described below, and on the other hand, in the case of judging that the outboard motor 12 that is able to be shifted out exists, the BCU 16 advances the process to step S708.

In step S708, the BCU 16 selects the outboard motors 12 to be shifted out. It should be noted that the number of the outboard motors 12 to be shifted out varies depending on the vessel speed of the marine vessel 10, the number of the outboard motors 12 included in the marine vessel 10, and the size of the hull 11. Specifically, the higher the vessel speed of the marine vessel 10 at the time of the judgment in step S706, the larger the number of the outboard motors 12 to be shifted out; the larger the number of the outboard motors 12 included in the marine vessel 10, the larger the number of the outboard motors 12 to be shifted out; and the larger the size of the hull 11, the larger the number of the outboard motors 12 to be shifted out. In addition, the BCU 16 selects the outboard motors 12 to be shifted out in consideration of a thrust balance between port and starboard. Specifically, the BCU 16 selects each outboard motor 12 that is arranged at a position symmetrically with respect to a center line passing through the center of gravity of the marine vessel 10 from the bow to the stern as the outboard motors 12 to be shifted out.

Next, the BCU 16 shifts out the selected outboard motors 12 (step S709). In FIG. 8, the outboard motors 12 to be shifted out are marked by hatching. At this time, since the overall thrust is reduced, the vessel speed of the marine vessel 10 is lower than the vessel speed when the engines 13 of all the outboard motors 12 are shifted to the idle state.

After that, the BCU 16 judges whether or not the shift levers 32 of the remote controller 20 or the stick 29 of the joystick 21 have/has been operated by the passenger (step S710). In the case that the passenger operates the shift levers 32 or the stick 29 after the selected outboard motors 12 are shifted out, for example, it is considered that the passenger speeds up the marine vessel 10 and changes the traveling direction of the marine vessel 10 in order for the passenger to find an obstacle in the sea route 35 and take an evasive action.

As a result of the judgment in step S710, in the case of judging that the operation of the shift levers 32 or the like is performed, the BCU 16 accelerates the marine vessel 10 by increasing the thrust of the outboard motor 12 that has not been shifted out yet according to the operation (step S711). Then, the BCU 16 returns the process to step S702. On the other hand, in the case of judging that the operation of the shift levers 32 or the like is not performed, the BCU 16 judges whether or not the marine vessel 10 has reached the shift-out position F (step S712). In the case of judging that the marine vessel 10 has not reached the shift-out position F, the BCU 16 returns the process to step S704. On the other hand, in the case of judging that the marine vessel 10 has reached the shift-out position F, the BCU 16 shifts out all the outboard motors 12 (step S713), further causes the MFD 17 or the like to display the mark or the icon to prompt the passenger to move the shift levers 32 to the neutral position, and then ends the deceleration control process.

According to the first preferred embodiment of the present invention, after the thrust generated by each outboard motor 12 is reduced and before the marine vessel 10 reaches the shift-out position F, when the throttle opening of each engine 13 is equal to or less than the predetermined value and the remaining distance is equal to or less than the required stopping-vessel distance, the selected outboard motors 12 are shifted out. As a result, the marine vessel 10 is sufficiently decelerated before the marine vessel 10 reaches the shift-out position F, and thus it is possible to prevent the marine vessel 10 from passing through the target position D.

In addition, in the first preferred embodiment of the present invention, before the marine vessel 10 reaches the shift-out position F, in the case that the throttle opening of each engine 13 is larger than the predetermined value, the outboard motors 12 will not be shifted out before the marine vessel 10 reaches the shift-out position F. As a result, it is possible to prevent the marine vessel 10 from being decelerated against the intention of the passenger.

In addition, in the first preferred embodiment of the present invention, before the marine vessel 10 reaches the shift-out position F, in the case that all the outboard motors 12 are in the shifted-out state when the outboard motor 12 that has not been shifted out yet is shifted out, the BCU 16 does not shift out the outboard motor 12 that has not been shifted out yet. As a result, since all the outboard motors 12 will not lose the thrust, in the case that the passenger finds an obstacle in the sea route 35 and takes an evasive action, the marine vessel 10 is able to react quickly to the operation of the passenger, and thus the marine vessel 10 is able to avoid a collision with the obstacle.

Furthermore, in the first preferred embodiment of the present invention, since the outboard motors 12 to be shifted out are selected in consideration of the thrust balance between port and starboard, even after the selected outboard motors 12 are shifted out, the thrust balance between port and starboard will not be lost, and directional stability of the marine vessel 10 will not be impaired.

In addition, in the first preferred embodiment of the present invention, before the marine vessel 10 reaches the shift-out position F, even after the selected outboard motors 12 are shifted out, when the passenger operates the shift levers 32 or the stick 29, the thrust of the outboard motor 12 that has not been shifted out yet is increased according to the operation. As a result, even after the selected outboard motors 12 are shifted out, the passenger is able to intentionally move the marine vessel 10 to avoid the collision with the obstacle.

In the first preferred embodiment of the present invention described above, when the throttle opening of each engine 13 is equal to or less than the predetermined value and the remaining distance is equal to or less than the required stopping-vessel distance, the selected outboard motors 12 are shifted out. However, as long as the throttle opening of each engine 13 is equal to or less than the predetermined value, the selected outboard motors 12 may be shifted out even if the remaining distance is longer than the required stopping-vessel distance.

Furthermore, after the thrust generated by each outboard motor 12 is reduced and before the marine vessel 10 reaches the shift-out position F, when the passenger intentionally moves the shift levers 32 of the remote controller 20 to the neutral position, the track point as the maneuvering mode is released. After the track point is released, the process returns to step S701, and the BCU 16 executes the deceleration control process again.

Furthermore, in the first preferred embodiment of the present invention described above, before the marine vessel 10 reaches the shift-out position F and after the selected outboard motors 12 are shifted out, when the passenger operates the shift levers 32 or the stick 29, the thrust of the outboard motor 12 that has not been shifted out yet is increased according to the operation. However, even before the selected outboard motors 12 are shifted out, when the passenger operates the shift levers 32 or the stick 29, the thrust of the outboard motor 12 is increased according to the operation. In addition, after the thrust of the outboard motor 12 is increased, the process returns to step S701, and the BCU 16 executes the deceleration control process again.

Next, a second preferred embodiment of the present invention will be described. The components, operations, and effects of the second preferred embodiment are basically the same as those of the first preferred embodiment described above, and the second preferred embodiment differs from the first preferred embodiment only in that the marine vessel 10 is provided with only one outboard motor 12. Therefore, the description of duplicated components, operations, and effects will be omitted, and different components, operations, and effects will be described below.

Figure 9:
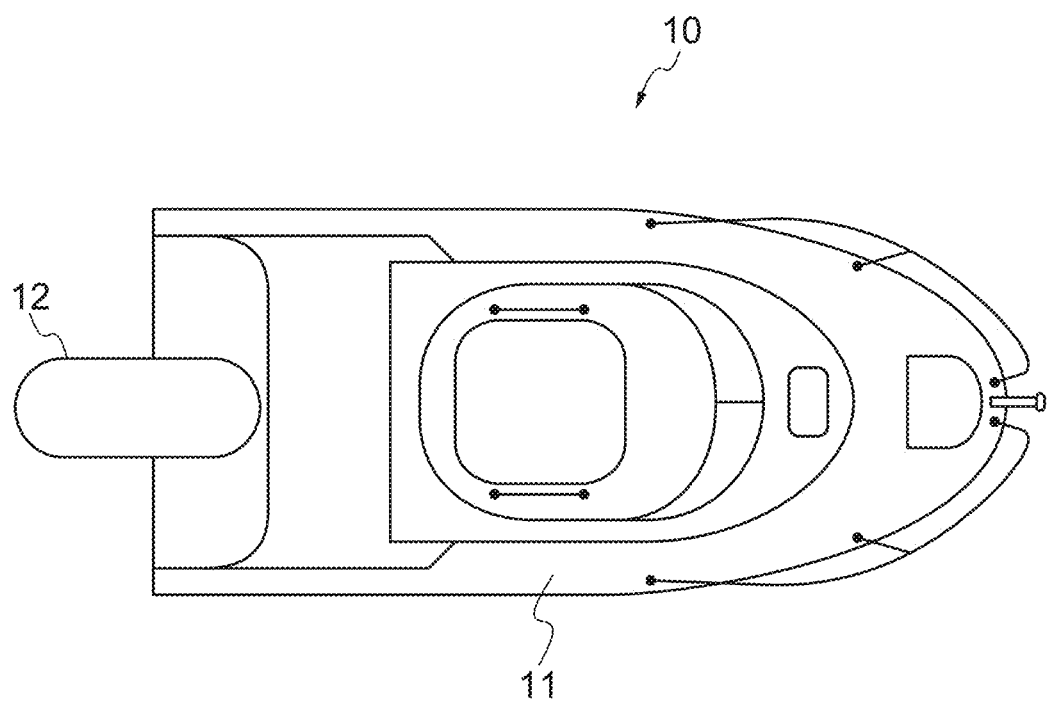
FIG. 9 is a plan view that schematically shows a marine vessel equipped with a marine vessel propulsion control system according to a second preferred embodiment of the present invention.

FIG. 9 is a plan view that schematically shows a marine vessel equipped with a marine vessel propulsion control system according to the second preferred embodiment of the present invention. As shown in FIG. 9, a marine vessel 10 includes only one outboard motor 12.

In the first preferred embodiment of the present invention described above, before the marine vessel 10 reaches the shift-out position F, several the outboard motors 12 among a plurality of the outboard motors 12 included in the marine vessel 10 are shifted out. However, in the case that the marine vessel 10 is provided with only one outboard motor 12, when this one outboard motor 12 is shifted out, since the outboard motor 12 will not generate a thrust and the thrust will not act on the marine vessel 10, it becomes difficult for the marine vessel 10 to take an evasive action of avoiding an obstacle.

In the second preferred embodiment of the present invention, in order to handle such a situation, before the marine vessel 10 reaches the shift-out position F, depending on a predetermined condition, the BCU 16 repeats a cut-off and recovery of the transmission of the drive force of the engine 13 of the one outboard motor 12 included in the marine vessel 10 to the propeller 14 (hereinafter referred to as "pattern shift").

Figure 10A:
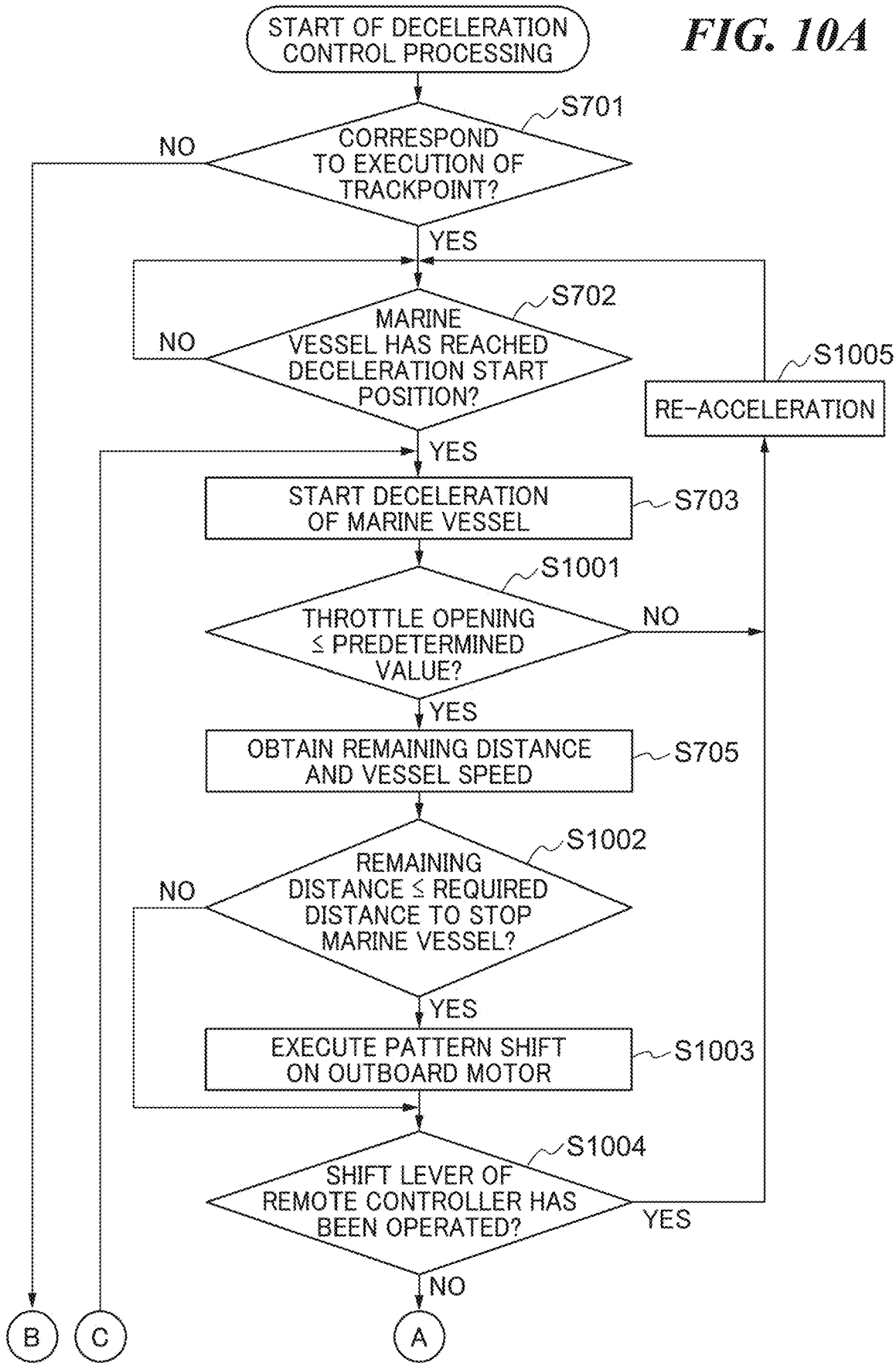
FIG. 10A is a portion of a flowchart that shows a deceleration control process according to the second preferred embodiment of the present invention.
Figure 10B:
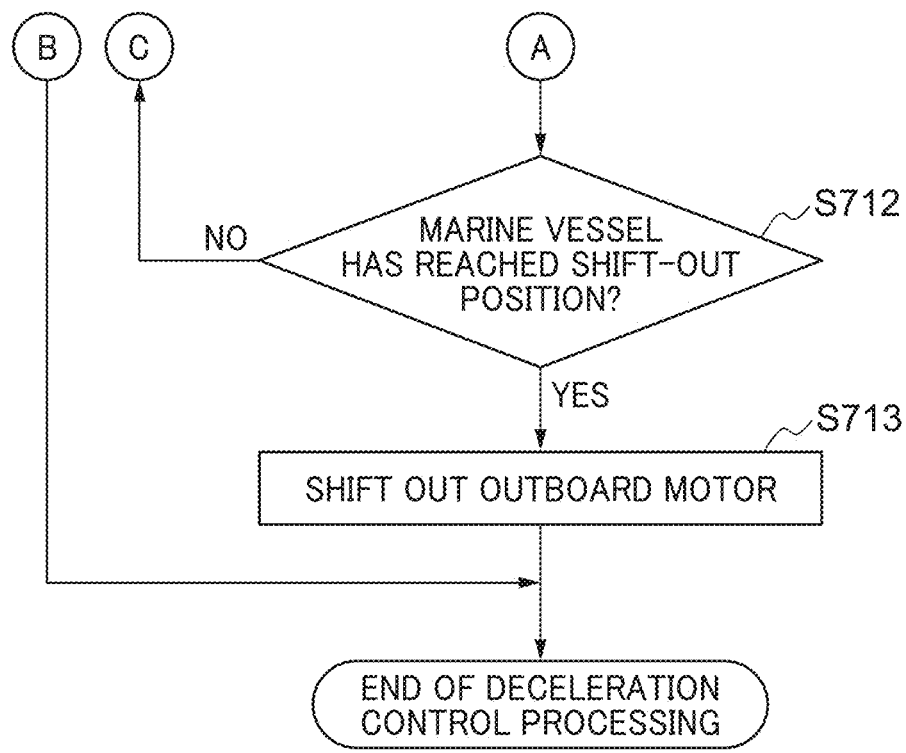
FIG. 10B is a portion of the flowchart that shows the deceleration control process according to the second preferred embodiment of the present invention.

FIGS. 10A and 10B is a flowchart that shows a deceleration control process according to the second preferred embodiment of the present invention. Also, the deceleration control process shown in FIGS. 10A and 10B is executed after the passenger sets the sea route 35 by using the MFD 17. It should be noted that the same reference numerals are given to steps that perform the same processes as each step of the deceleration control process in the first preferred embodiment and the description thereof will be omitted.

First, the BCU 16 executes steps S701 to S703, shifts the engine 13 of the outboard motor 12 to the idle state, starts the deceleration of the marine vessel 10, and then judges whether or not the throttle opening of the engine 13 is equal to or less than the predetermined value based on the position of the shift levers 32 of the remote controller 20 (step S1001). As a result of the judgment in step S1001, in the case of judging that the throttle opening is larger than the predetermined value, the BCU 16 advances the process to step S1005 described below, and on the other hand, in the case of judging that the throttle opening is equal to or less than the predetermined value, the BCU 16 advances the process to step S705.

Next, the BCU 16 executes step S705, and then judges whether or not the remaining distance is equal to or less than the required stopping-vessel distance (step S1002). The required stopping-vessel distance referred to in the second preferred embodiment of the present invention is a distance required to decelerate the marine vessel 10, in which the engine 13 has shifted to the idle state, by the resistance of water or the like, to the extent that the marine vessel 10 is able to be stopped at the target position D when one outboard motor 12 is shifted out at the shift-out position F. Also, in the second preferred embodiment of the present invention, the required stopping-vessel distance changes according to the vessel speed of the marine vessel 10 at the time of the judgment in step S1002. Specifically, the higher the vessel speed of the marine vessel 10, the longer the required stopping-vessel distance. As a result of the judgment in step S1002, in the case of judging that the remaining distance is longer than the required stopping-vessel distance, the BCU 16 advances the process to step S1004 described below, and on the other hand, in the case of judging that the remaining distance is equal to or less than the required stopping-vessel distance, the BCU 16 advances the process to step S1003.

Next, the BCU 16 executes a pattern shift on the outboard motor 12 (step S1003). When the pattern shift is executed, since the cut-off and the recovery of the transmission of the drive force of the engine 13 that has shifted to the idle state to the propeller 14 is repeated in the outboard motor 12, in step S703, the engine 13 simply shifts to the idle state, the vessel speed of the marine vessel 10 is lower than that in a not-shifted-out state. A time during which the transmission of the drive force of the engine 13 to the propeller 14 is cut off in the pattern shift varies depending on the vessel speed of the marine vessel 10 and the size of the hull 11. Specifically, the higher the vessel speed of the marine vessel 10 at the time of the judgment in step S1002, the longer the time during which the transmission of the drive force of the engine 13 to the propeller 14 is cut off; and the larger the size of the hull 11, the longer the time during which the transmission of the drive force of the engine 13 to the propeller 14 is cut off.

After that, the BCU 16 judges whether or not the shift levers 32 of the remote controller 20 or the stick 29 of the joystick 21 have/has been operated by the passenger (step S1004). In the case of judging that the operation of the shift levers 32 or the like is performed, the BCU 16 interrupts the pattern shift to recover the transmission of the drive force of the engine 13 to the propeller 14, and at the same time, accelerates the marine vessel 10 by increasing the drive force of the engine 13 according to the operation (step S1005). Then, the BCU 16 returns the process to step S702. On the other hand, in the case of judging that the operation of the shift levers 32 or the like is not performed, the BCU 16 executes steps S712 and S713, further causes the MFD 17 or the like to display the mark or the icon to prompt the passenger to move the shift levers 32 to the neutral position, and then ends the deceleration control process.

According to the second preferred embodiment of the present invention, after the thrust generated by the outboard motor 12 is reduced and before the marine vessel 10 reaches the shift-out position F, when the throttle opening of the engine 13 is equal to or less than the predetermined value and the remaining distance is equal to or less than the required stopping-vessel distance, the pattern shift is executed on the outboard motor 12. As a result, the marine vessel 10 is able to be sufficiently decelerated before the marine vessel 10 reaches the shift-out position F, and thus it is possible to prevent the marine vessel 10 from passing through the target position D.

Although preferred embodiments of the present invention have been described above, the present invention is not limited to the above-described preferred embodiments, and various modifications and changes can be made within the scope of the gist thereof.

For example, even in the case that the outboard motor 12 is equipped with not only the engine but also an electric motor functioning as an engine, or even in the case that the outboard motor 12 is equipped with only the electric motor, as long as the electric motor is controlled by the BCU 16, the above-described preferred embodiments of the present invention are applicable. Further, even in the case that the marine vessel 10 is provided with an inboard/outboard motor or an inboard motor instead of the outboard motor 12, as long as the inboard/outboard motor or the inboard motor is controlled by the BCU 16, the above-described preferred embodiments of the present invention are applicable.

Further, although the BCU 16 starts the dynamic positioning control according to the moving of the shift levers 32 to the neutral position by the passenger after the marine vessel 10 reaches the shift-out position F, the BCU 16 may start the dynamic positioning control simply according to the arrival of the marine vessel 10 at the target position D without waiting for the operation of the shift levers 32 or the like by the passenger.

Furthermore, when the marine vessel 10 reaches the deceleration start position E, although the BCU 16 shifts the engine 13 of each outboard motor 12 to the idle state, the BCU 16 may lower the engine speed of the engine 13 by a predetermined engine speed from a normal engine speed without reducing the engine speed of the engine 13 to an engine speed in the idle state.

Further, in the first preferred embodiment of the present invention, when the outboard motors 12 selected in step S708 are shifted out, in the case that the overall thrust acting on the marine vessel 10 is reduced and the directional stability of the marine vessel 10 is reduced, the BCU 16 may not shift out the selected outboard motors 12.

Furthermore, in the first preferred embodiment of the present invention, although the selected outboard motors 12 are shifted out, the BCU 16 may further decelerate the marine vessel 10 by performing the pattern shift on the selected outboard motors 12. As a result, it is possible to improve the accuracy of vessel speed adjustment of the marine vessel 10.

The present invention may be realized by reading out a program that performs the functions of each of the above-described preferred embodiments from a memory or the like included in the BCU 16 and executing the program by the BCU 16, alternatively, the present invention may be realized by supplying the program that performs the functions of each of the above-described preferred embodiments to the marine vessel propulsion control system 15 via a network or a storage medium, and executing the supplied program by the BCU 16. Furthermore, the present invention may also be realized by a circuit (for example, an ASIC) that performs one or more functions of the BCU 16.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel propulsion control system comprising:
a controller configured or programmed to control a movement of a marine vessel and a plurality of propulsion devices that apply a thrust to the marine vessel; wherein
each of the plurality of propulsion devices includes a power source and a thrust generator to generate the thrust based on a drive force of the power source; and
the controller is configured or programmed to:
control the movement of the marine vessel so that the marine vessel navigates according to a preset sea route including a target position where the marine vessel is to stop;
reduce the drive force of the power source of each of the plurality of propulsion devices when the marine vessel reaches a deceleration start position that is spaced apart from the target position by a required deceleration distance in a traveling direction of the marine vessel; and
after reducing the drive force of the power source of each of the plurality of propulsion devices, cut off transmission of the drive force from the power source to the thrust generator in at least one of the plurality of propulsion devices, but not all of the plurality of propulsion devices, depending on a predetermined condition and that an acting direction of any thrust generator of the plurality of propulsion devices not to be cut off is the same as the traveling direction of the marine vessel.

2. The marine vessel propulsion control system according to claim 1, wherein the predetermined condition is that a distance to the target position is equal to or less than a distance required for deceleration to stop the marine vessel at the target position.

3. The marine vessel propulsion control system according to claim 2, wherein the distance required for deceleration to stop the marine vessel at the target position is changed according to a vessel speed of the marine vessel.

4. The marine vessel propulsion control system according to claim 1, wherein a number of the plurality of propulsion devices, in which the transmission of the drive force from the power source to the thrust generator is cut off, is changed according to at least one of a size of a hull of the marine vessel and the number of the plurality of propulsion devices included on the marine vessel.

5. The marine vessel propulsion control system according to claim 1, wherein the required deceleration distance is a distance along the preset sea route.

6. The marine vessel propulsion control system according to claim 1, wherein
the controller is configured or programmed to cut off the transmission of the drive force from the power source to the thrust generator in all the plurality of propulsion devices when the marine vessel reaches a shift-out position just before the target position; and
a distance from the target position to the shift-out position is shorter than the required deceleration distance.

7. The marine vessel propulsion control system according to claim 6, wherein, after cutting off the transmission of the drive force from the power source to the thrust generator in all the plurality of propulsion devices, the controller is configured or programmed to prompt an operation to start a dynamic positioning control of the marine vessel to a passenger.

8. The marine vessel propulsion control system according to claim 1, wherein, when an operation with respect to the plurality of propulsion devices is performed by a passenger after the drive force of the power source of each of the plurality of propulsion devices is reduced, the controller is configured or programmed to change the drive forces of the power sources of the plurality of propulsion devices other than the plurality of propulsion devices in which the transmission of the drive force from the power source to the thrust generator is cut off according to the operation.

9. The marine vessel propulsion control system according to claim 1, wherein, as a result of cutting off the transmission of the drive force from the power source to the thrust generator in at least one of the plurality of propulsion devices depending on the predetermined condition in which a distance to the target position is equal to or less than a distance required for deceleration to stop the marine vessel at the target position, when the transmission of the drive force from the power source to the thrust generator in all the plurality of propulsion devices is cut off, the controller is configured or programmed to not cut off the transmission of the drive force from the power source to the thrust generator in the at least one of the plurality of propulsion devices.

10. The marine vessel propulsion control system according to claim 1, wherein, after reducing the drive force of the power source of each of the plurality of propulsion devices, the controller is configured or programmed to repeat a cut-off and recovery of the transmission of the drive force from the power source to the thrust generator in at least one of the plurality of propulsion devices depending on the predetermined condition.

11. A marine vessel propulsion control system comprising:
a controller configured or programmed to control a movement of a marine vessel and only one propulsion device that applies a thrust to the marine vessel; wherein
the only one propulsion device includes a power source and a thrust generator to generate the thrust based on a drive force of the power source; and
the controller is configured or programmed to:
control the movement of the marine vessel so that the marine vessel navigates according to a preset sea route including a target position where the marine vessel is to stop;
reduce the drive force of the power source of the only one propulsion device when the marine vessel reaches a deceleration start position that is spaced apart from the target position by a required deceleration distance; and
after reducing the drive force of the power source of the only one propulsion device, the controller is configured or programmed to repeat cut-off and recovery of transmission of the drive force from the power source to the thrust generator in the only one propulsion device depending on a predetermined condition;
cut off the transmission of the drive force from the power source to the thrust generator in the only one propulsion device when the marine vessel reaches a shift-out position just before the target position; and
a distance from the target position to the shift-out position is shorter than the required deceleration distance.

12. The marine vessel propulsion control system according to claim 11, wherein the predetermined condition is that a distance to the target position is equal to or less than a distance required for deceleration to stop the marine vessel at the target position.

13. The marine vessel propulsion control system according to claim 12, wherein the distance required for deceleration to stop the marine vessel at the target position is changed according to a vessel speed of the marine vessel.

14. The marine vessel propulsion control system according to claim 11, wherein the required deceleration distance is a distance along the preset sea route.

15. The marine vessel propulsion control system according to claim 11, wherein, after cutting off the transmission of the drive force from the power source to the thrust generator in the only one propulsion device, the controller is configured or programmed to prompt an operation to start a dynamic positioning control of the marine vessel to a passenger.

16. The marine vessel propulsion control system according to claim 11, wherein, when an operation with respect to the propulsion device is performed by a passenger after the drive force of the power source of the only one propulsion device is reduced, the controller is configured or programmed to recover the transmission of the drive force from the power source to the thrust generator and change the drive force of the power source according to the operation.

17. A marine vessel comprising:
a controller configured or programmed to control a movement of a marine vessel and a plurality of propulsion devices that apply a thrust to the marine vessel; wherein
each of the plurality of propulsion devices includes a power source and a thrust generator to generate the thrust based on a drive force of the power source; and
the controller is configured or programmed to:
control the movement of the marine vessel so that the marine vessel navigates according to a preset sea route including a target position where the marine vessel is to stop;
reduce the drive force of the power source of each of the plurality of propulsion devices when the marine vessel reaches a deceleration start position that is spaced apart from the target position by a required deceleration distance in a traveling direction of the marine vessel; and
after reducing the drive force of the power source of each of the plurality of propulsion devices, cut off transmission of the drive force from the power source to the thrust generator in at least one of the plurality of propulsion devices, but not all of the plurality of propulsion devices, depending on a predetermined condition and that an acting direction of any thrust generator of the plurality of propulsion devices not to be cut off is the same as the traveling direction of the marine vessel.

* * * * *